Patented Apr. 10, 1945

2,373,250

UNITED STATES PATENT OFFICE 2,373,250

ARTIFICIAL DRYING OIL

William H. Lycan and Joseph L. Eyre, Milwaukee, Wis., assignors to Pittsburgh Plate Glass Company, a corporation of Pennsylvania No Drawing. Application March 14, 1940, Serial No. 323,942

11 Claims. (Cl. 106—252)

The present invention relates to the preparation of artificial compounds of an oily nature and possessing drying properties, and it has particular relation to the preparation of such compounds by the interaction of amino alcohols possessing two or more hydroxy groups with unsaturated fatty acids from natural glycerides.

One object of the invention is to provide a simple and economical process of converting free fatty acids into oils suitable for use either alone or in combination with other drying oils and compounding ingredients to form paints and varnishes.

A second object of the invention is to provide a drying oil which, although it possesses good drying characteristics when applied as a film to a surface, still is relatively free from the tendency to form surface skins during storage in containers.

A third object of the invention is to provide an artificial drying oil which may be used alone or in combination with other drying oils to form films possessing relatively high resistance to permeation or attack by moisture.

These and other objects of the invention will be apparent from consideration of the following specification and the appended claims.

Conventional paints and varnishes commonly contain as their main film-forming ingredient certain glycerides of relatively highly unsaturated higher fatty acids which are found to be characterized by the capacity to absorb oxygen and to undergo various reactions involving interlinkage of molecules to form solid and relatively durable films upon exposure to air.

According to the provisions of the present invention, it is proposed to react unsaturated fatty acids, such as may be obtained by saponification of a drying or semi-drying oil with alkyl amines containing at least two available hydroxyl groups to provide oils having drying properties. Amines suitable for reaction with the acids include compounds of the type represented by the formula $(NH_2)_y R(OH)_x$, where R is hydrocarbon, "$y$" is a whole number equal to or greater than 1, and "$x$" is a whole number equal to or greater than 2. In the formula the amino group may include 1 or even 2 substituents, such as alkyl groups or the like; that is, it may be either primary or secondary. The use of amines such as diethanol amine in which two alcohol groups are joined to a single amine group is contemplated. The formula of the ester would be: $(NHCOR_1)(ROOCR_2)$, where $R_1$ and $R_2$ are hydrocarbons.

The reaction of the amino alcohols with the fatty acids probably involves esterification of the hydroxy groups by the fatty acids accompanied by amidation of the amino group by the same acid.

A series of drying oils has been obtained by the condensation of organic amino hydroxy compounds with unsaturated organic acids. The amino hydroxy compounds were selected from a group consisting of alkyl amines further substituted by two or more hydroxy groups. The unsaturated acids were derived from natural sources and had iodine numbers of 135 or above. Thus the acids obtained by hydrolysis of linseed oil, China-wood oil, fish oil, dehydrated castor oil and the like were found satisfactory for the purpose.

The condensations were carried out by regular esterification processes both in the presence and absence of inert diluents and esterification catalysts. In general, the reactions were quite rapid and could be carried to completion without difficulty.

The products were oils varying in viscosity and color depending on the nature and purity of the intermediates from which they were derived. They were soluble in all the common solvents used for natural drying oils and, when exposed to air in thin films, dried much as do the natural oils. Drying times varied rather widely and were all greatly reduced by the addition of driers. Very slightly tacky to tack-free films were obtained in from one to four days depending on the drier used. The films were continuous, non-brittle and very highly adherent.

The oils may be used for any of the common applications of drying oils or may be mixed with natural drying oils and used in combination. The following examples will serve to clarify the nature of the invention:

Example 1

A mixture was prepared by adding 121 parts of aminotrimethylol methane to 862 parts of linseed oil acids under agitation in an atmosphere of carbon dioxide. If allowed to stand at this point, a solid salt formed which melted as the mixture was gradually heated to reaction temperature. A small amount of litharge (½ part) was added as a catalyst and the charge was heated in about 1 hour to 220° C. A stream of carbon dioxide gas was passed continuously through the reaction mixture and vigorous agitation was maintained at all times. After 3 hours the acid number of the mixture had been reduced to 12.8 and, after 6 hours, a second sample showed an acid number of 7.0.

The charge was then cooled to room temperature and was vigorously stirred with 65 parts of 10% aqueous caustic solution. The mixture was allowed to separate and the oil layer was decanted and treated with 20 parts of tonsil earth at 35° C. After filtration, the product was obtained as a light colored oil of medium viscosity. It was soluble in the common organic solvents and upon exposure to air in thin layers dried to a highly adherent film characterized by a slight residual tackiness. The addition of driers decreased the drying time.

*Example 2*

242 parts of fish oil acids were dissolved in 200 parts of dibutyl ether and 24 parts of amino-trimethylol methane were added. The resultant solution was heated at 140–145° C. at which temperature the dibutyl ether distilled carrying with it water formed in the reaction. The distillate was condensed and separated and the dibutyl ether was continuously returned to the reaction mixture. After six hours, 13.1 parts of water had been separated and, at this point, the dibutyl ether was distilled from the mass. The charge was heated 6 hours longer at 160–170° C. after which the reaction was complete.

The product was a rather dark colored but very fluid oil which, in the presence of driers, yielded adherent tack-free films in less than 24 hours exposure in air.

*Example 3*

A mixture of 248 parts of dehydrated castor oil acids and 34.5 parts of 2-amino-2-ethyl-1,3-propanediol was strongly agitated and heated to 220° C. A stream of carbon dioxide gas was passed continuously through the charge serving the double purpose of carrying out water formed in the reaction and maintaining an inert atmosphere. After 7 hours under these conditions, the reaction was complete and the charge was cooled to room temperature.

The product was an oil of medium viscosity which, upon exposure to air in thin films, dried almost tack-free in 24 hours.

*Example 4*

A solution was prepared consisting of 168 parts of linseed oil acids and 21 parts of 2-amino-2-methyl-1,3-propanediol in 200 parts of xylene. Carbon dioxide gas was passed in continuously and the charge was heated at 140–150° C. at which temperature, the xylene and water formed in the reaction distilled. The distillate was continuously separated and the xylene was returned to the reaction mixture. After 7 hours the reaction was complete and the xylene was completely removed by distillation under reduced pressure.

The product was an oil of medium viscosity which, when exposed to air in thin films in the presence of driers, dried to a tacky film, and after four days the films were still slightly tacky.

A very similar product was obtained by the condensation of 285 parts of China-wood oil acids and 30 parts of amino-trimethylol-methane. The product was quite dark and dried in the presence of driers to films remaining tacky after as long as 5 days exposure in air.

*Example 5*

276 parts of dehydrated castor oil acids were condensed with 30.5 parts of amino-trimethylol-methane by heating at 170–180° C. in the presence of a stream of carbon dioxide gas. When no further water was eliminated, the charge was cooled and the product was obtained as a light colored fluid oil. It dried in the presence of driers to a film showing very slight tackiness after 2 days exposure.

A somewhat darker but otherwise very similar product was obtained by condensing 182 parts of fish oil acids with 21 parts of 2-amino-2-methyl-1,3-propanediol in the presence of xylene.

It is to be understood that in the foregoing Examples 1–5 inclusive the acids of various drying oils including linseed oil, China-wood oil, fish oil, dehydrated castor oil and others are mutually interchangeable in each example. It is thus possible to substitute fish oil, China-wood oil, dehydrated castor oil, and others for the linseed oil acids of Example 1, linseed, tung or China-wood, dehydrated castor oil or the like acids in Example 2, and so on through the remainder of the group. Two or more amino polyhydric alcohols may be admixed in equi-molar or other ratios and then reacted with one or more of the drying oil acids. Any two or more of the acids may be admixed in any desired proportion and then reacted with the amino polyhydroxy alcohol.

The drying oils as thus obtained are characterized by but slight tendency to form skins during storage in containers. The films obtained from each are also characterized by relatively high resistance to the action of moisture.

The new drying oils may be admixed even in relatively small amounts with other drying oils such as linseed oil, tung oil, fish oil, or the like for purposes of reducing the skinning effects noticeable in connection with the unmodified oil. For this purpose it is found that from 1–5 per cent of the delivatives of the amino alcohols is sufficient. However, much greater amounts may be employed if so desired.

A variation of the process would involve effecting esterification of a polyhydric amino alcohol such as herein disclosed, with free acids inherently present in drying oils to provide a composition of low acid value.

For purposes of forming a paint or varnish from the esters, the latter may be used substantially pure or they may be formulated in accordance with conventional practice. For example, the compounds, either by themselves or when admixed with other drying oils, may be combined with driers such as cobalt, linoleate or the like, with solvents and diluents, such as turpentine, etc., with colors and pigments including titanium dioxide, basic lead carbonate and many others. The compositions may be employed for coating woods, either for indoor or outdoor use, or for coating metals, such as iron or steel, or for any of the purposes for which drying oils are commonly employed.

What we claim is:

1. A material having the drying properties of a drying oil and comprising an ester of an amino hydroxy alkyl alkane containing at least two hydroxy groups and a free drying oil acid.

2. As a coating composition, an ester of an amino hydroxy alkyl alkane containing at least two hydroxy groups and a free drying oil acid, said ester being admixed with a pigmentary body and having the air drying characteristics of a natural drying oil.

3. A compound having air drying characteristics comprising an ester of an unsaturated higher fatty acid of a drying oil and a hydroxy amine selected from a group consisting of 2-amino-2- methyl-1,3 propanediol, amino trimethylol methane, 2-amino-2-ethyl-1,3 propanediol.

4. A compound as defined in claim 3 in which the acid is a free acid from an oil selected from the group consisting of linseed oil, dehydrated castor oil, China-wood oil, fish oil, oiticica oil, perilla oil and soya bean oil.

5. A process of preparing a compound having the drying characteristics of a drying oil, which process comprises heating a mixture of an amino hydroxy alkyl alkane containing at least two hydroxy groups and a free drying oil acid in an inert atmosphere to form an ester.

6. A process as defined in claim 5 in which the inert atmosphere comprises carbon dioxide.

7. A process as defined in claim 5 in which the free acid and the amino hydroxy alkyl alkane compound are reacted in the presence of xylol.

8. As a coating composition an ester of an amino hydroxy alkyl alkane containing at least 2 hydroxy groups and a free drying oil acid, said ester being admixed with a drying oil.

9. A coating composition comprising an oil having the air drying properties of a natural glyceride drying oil and being an ester of a free drying oil acid and an amino hydroxy alkyl alkane containing from 2 to 3 hydroxy alkyl groups, at least two of said groups being esterified by the drying oil acid.

10. A coating composition as defined in claim 9 in which the hydroxy alkyl groups contain from 1 to 2 carbon atoms.

11. A coating composition as defined in claim 9 in which the amine group is further amidated by a free drying oil acid.

WILLIAM H. LYCAN.
JOSEPH L. EYRE.